United States Patent
Breese

(10) Patent No.: US 8,440,125 B2
(45) Date of Patent: May 14, 2013

(54) POLYETHYLENE FILMS HAVING HIGH RESISTANCE TO DEFORMATION OR ELONGATION

(75) Inventor: D. Ryan Breese, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 1355 days.

(21) Appl. No.: 10/879,763

(22) Filed: Jun. 28, 2004

(65) Prior Publication Data

US 2005/0287359 A1    Dec. 29, 2005

(51) Int. Cl.
*B29C 71/00* (2006.01)
*B29C 47/88* (2006.01)
*B29C 55/00* (2006.01)

(52) U.S. Cl.
USPC ........... 264/235.6; 264/175; 264/210.5; 264/210.7; 264/211.18; 264/211.2; 264/288.4

(58) Field of Classification Search ........... 264/288.4
See application file for complete search history.

(56) References Cited

U.S. PATENT DOCUMENTS

| | | | |
|---|---|---|---|
| 3,179,326 A * | 4/1965 | Underwood et. al. | 229/203 |
| 4,226,905 A * | 10/1980 | Harbourne | 428/220 |
| 4,461,873 A * | 7/1984 | Bailey et al. | 525/240 |
| 4,542,199 A | 9/1985 | Kaminsky et al. | |
| 4,606,879 A | 8/1986 | Cerisano | |
| 4,954,391 A | 9/1990 | Kotani et al. | |
| 5,451,450 A * | 9/1995 | Erderly et al. | 428/220 |
| 5,539,124 A | 7/1996 | Etherton et al. | |
| 5,635,262 A * | 6/1997 | Best et al. | 428/36.92 |
| 5,637,660 A | 6/1997 | Nagy et al. | |
| 5,756,611 A | 5/1998 | Etherton et al. | |
| 5,989,725 A | 11/1999 | Bullard et al. | |
| 6,034,027 A | 3/2000 | Krishnamurti et al. | |
| 6,221,982 B1 * | 4/2001 | Debras et al. | 526/64 |
| 6,265,504 B1 | 7/2001 | Liu et al. | |
| 6,294,500 B1 * | 9/2001 | Debras et al. | 502/228 |
| 6,391,411 B1 * | 5/2002 | Duckwall et al. | 428/35.7 |
| 6,486,270 B1 | 11/2002 | Garrison et al. | |
| 6,613,841 B2 | 9/2003 | Williams | |
| 2003/0153688 A1 * | 8/2003 | Lindahl et al. | 525/240 |

FOREIGN PATENT DOCUMENTS

| | | |
|---|---|---|
| EP | 86906464.2 A1 | 11/1987 |
| GB | 1541681 | 7/1977 |
| WO | 2005/077640 | 8/2005 |

OTHER PUBLICATIONS

Eric Hatfield, Richard Tate, Kelly Williams, and William Todd; New MDO Medium Molecular Weight High Density Polyethylene Films; Journal of Plastic Film & Sheeting: Apr. 2002, pp. 117-127; vol. 18; Sage Publications.

* cited by examiner

*Primary Examiner* — Jeffrey Wollschlager

(57) ABSTRACT

Disclosed is a method for producing polyethylene films which have high resistance to deformation or elongation under loading in tension. The method comprises orienting in the machine direction (MD) a high density polyethylene film at a draw-down ratio effective to give the film an MD tensile strength at yield greater than or equal to 50,000 psi, wherein the HDPE has a density greater than 0.940 g/cm$^3$.

13 Claims, No Drawings

POLYETHYLENE FILMS HAVING HIGH RESISTANCE TO DEFORMATION OR ELONGATION

FIELD OF THE INVENTION

The invention relates to polyethylene films. More particularly, the invention relates to polyethylene films which have high resistance to deformation or elongation under loading in tension.

BACKGROUND OF THE INVENTION

Polyethylene is divided into high-density (HDPE, density 0.941 g/cm$^3$ or greater), medium-density (MDPE, density from 0.926 to 0.940 g/cm$^3$), low-density (LDPE, density from 0.910 to 0.925 g/cm$^3$), and linear low-density polyethylene (LLDPE, density from 0.910 to 0.925 g/cm$^3$). See ASTM D4976-98: Standard Specification for Polyethylene Plastic Molding and Extrusion Materials. Polyethylene can also be divided by molecular weight. For instance, ultra-high molecular weight polyethylene denotes those which have a weight average molecular weight (Mw) greater than 3,000,000. See U.S. Pat. No. 6,265,504. High molecular weight polyethylene usually includes those which have an Mw from 130,000 to 1,000,000.

One of the main uses of polyethylene (HDPE, LLDPE, and LDPE) is in film applications, such as grocery sacks, institutional and consumer can liners, merchandise bags, shipping sacks, food packaging films, multi-wall bag liners, produce bags, deli wraps, stretch wraps, and shrink wraps. The key physical properties of polyethylene film include tear strength, impact strength, tensile properties, stiffness and transparency. Tensile properties are an important indicator of the material's behavior under loading in tension. Tensile properties include tensile strength at yield, tensile strength at break (ultimate tensile strength), tensile modulus (Young's modulus), and elongation at yield and break. High tensile strength at yield is required for heavy duty bags such as those for trash, top soil, and fertilizer. High tensile strength at yield means high resistance to deformation or elongation under loading.

Machine direction orientation (MDO) is known to the polyolefin industry. When a polymer is strained under uniaxial stress, the orientation becomes aligned in the direction of pull. For instance, U.S. Pat. No. 6,391,411 teaches the MDO of very high molecular weight (both Mn and Mw greater than 1,000,000) HDPE films. However, MDO of very high molecular weight HDPE films are limited because these films are difficult to stretch to a high draw-down ratio.

Polyethylene films, although having many desirable properties for the use in heavy duty bags, have low tensile strength at yield. Imagine that a person carries a 50-pound trash bag, while the bag elongates to five-foot long. She or he will feel unsafe and inconvenient. It would be desirable to prepare a polyethylene film which, along with other properties, has high tensile strength at yield so that the film can be used for heavy duty bags.

SUMMARY OF THE INVENTION

The invention is a method for preparing a polyethylene film which has high resistance to deformation or elongation under load in tension. The method comprises orienting in the machine direction (MD) a high density polyethylene (HDPE) film at a draw-down ratio effective to give the film an MD tensile strength at yield greater than or equal to 50,000 psi. The HDPE has a density greater than 0.940 g/cm$^3$. Preferably, the HDPE has a density within the range of 0.950 to 0.965 g/cm$^3$, a weight average molecular weight (Mw) within the range of 130,000 to 1,000,000, and a number average molecular weight (Mn) within the range of 10,000 to 500,000.

DETAILED DESCRIPTION OF THE INVENTION

Tensile properties are an important indicator of the material's behavior under loading in tension. Tensile properties include tensile strength at yield, tensile strength at break (ultimate tensile strength), tensile modulus (Young's modulus), and elongation at yield and break. Tensile strength at yield is the maximum stress at which permanent, non-elastic deformation begins. Yield point is the point (load) at which the material yields, i.e., increase in strain occurs without an increase in stress. Ultimate tensile strength is the maximum stress a material can withstand before failing. Elongation at yield is the strain that the material undergoes at the yield point, or the percent change in length that occurs while the material is stressed to its yield point. Elongation at break is the strain at failure, or the percent change in length at failure. Tensile, or Young's modulus, is the ratio of stress to strain within the elastic region of the stress-strain curve (prior to the yield point).

The method of the invention provides polyethylene films having improved tensile properties. The method comprises orienting in the machine direction (MD) a high density polyethylene (HDPE) film at a draw-down ratio effective to give the film an MD tensile strength at yield greater than or equal to 50,000 psi. Polyethylene resins suitable for making the HDPE film for the use in the invention have a density greater than 0.940 g/cm$^3$. Preferably the density is within the range of about 0.941 to about 0.965 g/cm$^3$. More preferably, the density is within the range of about 0.949 to about 0.959 g/cm$^3$.

Preferably, the polyethylene resins have a number average molecular weight (Mn) within the range of about 10,000 to about 500,000, more preferably from about 11,000 to about 50,000, and most preferably from about 11,000 to about 20,000. Preferably, the polyethylene resin has a weight average molecular weight (Mw) within the range of about 130,000 to about 1,000,000, more preferably from about 150,000 to about 500,000, and most preferably from about 155,000 to about 250,000. Preferably, the polyethylene resin has a molecular weight distribution (Mw/Mn) within the range of about 5 to about 20, more preferably from about 7 to about 18, and most preferably from about 9 to about 17.

The Mw, Mn and Mw/Mn are obtained by gel permeation chromatography (GPC) on a Waters GPC2000CV high temperature instrument equipped with a mixed bed GPC column (Polymer Labs mixed B-LS) and 1,2,4-trichlorobenzene (TCB) as the mobile phase. The mobile phase is used at a nominal flow rate of 1.0 mL/min and a temperature of 145° C. No antioxidant is added to the mobile phase, but 800 ppm BHT is added to the solvent used for sample dissolution. Polymer samples are heated at 175° C. for two hours with gentle agitation every 30 minutes. Injection volume is 100 microliters.

The Mw and Mn are calculated using the cumulative matching % calibration procedure employed by the Waters Millennium 4.0 software. This involves first generating a calibration curve using narrow polystyrene standards (PSS, products of Waters Corporation), then developing a polyethylene calibration by the Universal Calibration procedure.

Preferably, the polyethylene resins have a melt index $MI_2$ from about 0.03 to about 0.15 dg/min, more preferably from about 0.04 to about 0.15 dg/min, and most preferably from 0.05 to 0.10. The $MI_2$ is measured at 190° C. under 2.16 kg of pressure according to ASTM D-1238. In general, the higher the molecular weights, the lower the $MI_2$ values.

Preferably, the polyethylene resins are copolymers that comprise from about 90 wt % to about 98 wt % of recurring units of ethylene and from about 2 wt % to about 10 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene, and the like, and mixtures thereof.

Suitable polyethylene resins can be produced by Ziegler catalysts or single-site catalysts. Ziegler catalysts are well known. Examples of suitable Ziegler catalysts include titanium halides, titanium alkoxides, vanadium halides, and mixtures thereof. Ziegler catalysts are used with cocatalysts such as alkyl aluminum compounds.

Single-site catalysts can be divided into metallocene and non-metallocene. Metallocene single-site catalysts are transition metal compounds that contain cyclopentadienyl (Cp) or Cp derivative ligands. For example, U.S. Pat. No. 4,542,199, the teachings of which are incorporated herein by reference, teaches metallocene catalysts. Non-metallocene single-site catalysts contain ligands other than Cp but have the same catalytic characteristics as metallocenes. The non-metallocene single-site catalysts may contain heteroatomic ligands, e.g., boraaryl, pyrrolyl, azaborolinyl or quinolinyl. For example, U.S. Pat. Nos. 6,034,027, 5,539,124, 5,756,611, and 5,637,660, the teachings of which are incorporated herein by reference, teach non-metallocene catalysts.

The polyethylene resins are converted into thick films by a high-stalk or in-pocket blown extrusion process. Both high-stalk and in-pocket processes are commonly used for making polyethylene films. The difference between the high-stalk process and the in-pocket process is that in the high-stalk process, the extruded tube is inflated a distance (i.e., the length of the stalk) from the extrusion die, while the extruded tube in the in-pocket process is inflated as the tube exits the extrusion die.

For instance, U.S. Pat. No. 4,606,879, the teachings of which are herein incorporated by reference, teaches high-stalk blown film extrusion apparatus and method. The process temperature is preferably within the range of about 150° C. to about 210° C. The thickness of the film is preferably within the range of about 3 to about 14 mils, more preferably within the range of about 6 to about 8 mils.

The blown films are then uniaxially stretched in the machine (or processing) direction to a thinner film. The ratio of the film thickness before and after orientation is called "draw-down ratio." For example, when a 6-mil film is stretched to 0.6-mil, the draw-down ratio is 10:1. The draw-down ratio of the method of the invention is preferably greater than or equal to 7:1. More preferably, the draw-down ratio is greater than or equal to 10:1. Most preferably, the draw-down ratio is greater than or equal to 11:1.

During the MDO, the film from the blown-film line is heated to an orientation temperature. Preferably, the orientation temperature is between 60% of the difference between the glass transition temperature (Tg) and the melting point (Tm) and the melting temperature (Tm). For instance, if the blend has a Tg of 25° C. and a Tm of 125° C., the orientation temperature is preferably within the range of about 60° C. to about 125° C. The heating is preferably performed utilizing multiple heating rollers.

Next, the heated film is fed into a slow draw roll with a nip roller, which has the same rolling speed as the heating rollers. The film then enters a fast draw roll. The fast draw roll has a speed that is 2 to 10 times faster than the slow draw roll, which effectively stretches the film on a continuous basis.

The stretched film then enters annealing thermal rollers, which allow stress relaxation by holding the film at an elevated temperature for a period of time. The annealing temperature is preferably within the range of about 100° C. to about 125° C. and the annealing time is within the range of about 1 to about 2 seconds. Finally, the film is cooled through cooling rollers to an ambient temperature.

The invention includes the MD oriented (MDO) film made by the method. The MDO film has an MD tensile strength at yield greater than or equal to 50,000 psi. Tensile strength is tested according to ASTM D-882. Preferably, the MDO film has an MD tensile strength at yield greater than about 55,000 psi. Most preferably, the MDO film has an MD tensile strength at yield greater than about 69,000 psi.

Preferably, the MDO film has an MD Young's modulus greater than or equal to 500,000 psi. More preferably, the MD Young's modulus is greater than 900,000 psi. Most preferably, the MD Young's modulus is greater than 1,000,000 psi. Preferably, the MDO film has an MD tensile strength at break greater than 40,000 psi. More preferably, the MD tensile strength at break is greater than 50,000 psi. Most preferably, the MD tensile strength at break is greater than 55,000 psi.

Preferably, the MDO film has an MD elongation at yield is less than 25%. More preferably, the MD elongation at yield is less than 20%. Most preferably, the MD elongation at yield is less than 15%. Preferably, the MDO film has an MD elongation at break less than 50%. More preferably, the MD elongation at break is less than 25%. Most preferably, the MD elongation at break is less than 14%. Preferably, the MDO film has an MD elongation at yield which is essentially the same as the MD elongation at break.

The MDO film preferably remains at high transverse direction (TD) properties. Preferably, the MDO film has a TD Young's modulus greater than 300,000 psi; more preferably, greater than 350,000 psi. Preferably, the MDO film has a TD elongation at yield less than 4%, more preferably less than 3.5%. Preferably, the MDO film has a TD tensile strength at yield greater than 5,000 psi. Preferably, the MDO film has a TD elongation at break less than 400%, more preferably less than 300%. Preferably, the MDO film has a TD tensile strength at break greater than 3,500 psi.

The following examples merely illustrate the invention. Those skilled in the art will recognize many variations that are within the spirit of the invention and scope of the claims.

EXAMPLES 1-11

Machine Direction Orientation of High Density (0.959 g/cm$^3$) High Stalk Polyethylene Films A high density polyethylene (L5906, product of Equistar Chemicals, LP, $MI_2$: 0.057 dg/min, density: 0.959 g/cm$^3$, Mn: 12,900, Mw: 207,000, and Mw/Mn: 16) is converted into films with a thickness of 6.0 mil on 200 mm die with 2 mm die gap. The films are produced at a stalk height of 8 die diameters and at blow-up ratios (BUR) of 4:1.

The films are then stretched into thinner films in the machine direction with draw-down ratios 1, 2, 3, 4, 5, 6, 7, 8, 9, 10, and 11.6 in Examples 1-11, respectively. When the draw-down ratio is 1:1, the film is not oriented. The draw-down ratio of 11.6:1 is the maximum draw-down ratio limited by the orientation equipment and not the polymer film. The film properties are listed in Table 1. The data shows that as the films are oriented in the machine direction, the percent change in the difference between the MD break elongation % and MD yield elongation % relative to the unoriented film decreases to the point where the MD break elongation % is nearly identical to the MD yield elongation %. Similarly, as the draw-down ratio increases, the MD yield and break strengths substantially increase, indicating the film can withstand a significantly heavier load prior to both yielding (stretching) and breaking. A similar convergence in yield and break elongation %, but to a lesser degree, is seen in the transverse-direction properties of the films.

EXAMPLES 12-22

Machine Direction Orientation of High Density (0.959 g/cm$^3$) In-pocket Polyethylene Films Examples 1-11 are repeated, but the films are made at in-pocket film line. The film properties are listed in Table 2, which shows that the machine direction oriented, in-pocket films have similar MD and TD tensile properties as the high stalk films at the various draw ratios. The draw-down ratio of 11.3:1 is the maximum draw-down ratio limited by the orientation equipment and not the polymer film. The enhancements in tensile properties for examples 12-22 are similar to those discussed for examples 1-11.

EXAMPLES 23-30

Machine Direction Orientation of High density Films of Various Densities and MI$_2$ Three Equistar high density polyethylene resins, XL3805 (density: 0.940 g/cm$^3$, MI$_2$: 0.057 dg/min, Mn: 18,000, Mw: 209,000), XL3810 (density: 0.940 g/cm$^3$, MI$_2$: 0.12 dg/min, Mn: 16,000, Mw: 175,000), L4907 (density: 0.949 g/cm$^3$, MI$_2$: 0.075 dg/min, Mn: 14,300, Mw: 194,700), and L5005 (density: 0.949 g/cm$^3$, MI$_2$: 0.057 dg/min, Mn: 12,600, Mw: 212,000) are converted into films of thickness of 6.0 mil by the high stalk process described in Examples 1-11 and the in-pocket process described in examples 12-22. The blown films are then stretched in the machine direction. Listed in Table 3 are the machine direction and transverse direction tensile properties of each oriented film at their maximum draw-down ratios. The table shows that the tensile property enhancements depend on the density and MI$_2$ of the polyethylene resin, the blown film process, and maximum draw-down ratio of the MDO.

TABLE 1

Properties vs. Draw-down Ratio of High Density (0.959 g/cm$^3$), High Stalk Films

| | | Properties in Machine Direction (MD) | | | | | | Properties in Transverse Direction (TD) | | | | |
|---|---|---|---|---|---|---|---|---|---|---|---|---|
| Ex. No. | Draw-down ratio | Modulus psi | Elongation @ yield % | Tensile strength @ yield psi | Elongation @ break % | Tensile strength @ break psi | Elongation @ break/ elongation @ yield | Modulus psi | Elongation @ yield % | Tensile strength @ yield psi | Elongation @ break % | Tensile strength @ break psi | Elongation @ break/ elongation @ yield |
| 1 | 1:1 | 188,600 | 8.0 | 4,800 | 470 | 5,500 | 59 | 196,200 | 6.0 | 5,100 | 690 | 5,100 | 115 |
| 2 | 2:1 | 224,500 | 17 | 7,400 | 310 | 10,900 | 18 | 248,600 | 4.7 | 4,600 | 680 | 4,900 | 145 |
| 3 | 3:1 | 267,300 | 20 | 12,500 | 200 | 14,900 | 10 | 279,500 | 4.5 | 4,800 | 660 | 4,700 | 147 |
| 4 | 4:1 | 318,200 | 21 | 20,500 | 130 | 19,300 | 6 | 301,000 | 4.4 | 5,000 | 610 | 4,500 | 139 |
| 5 | 5:1 | 378,800 | 23 | 30,200 | 88 | 25,200 | 4 | 317,900 | 4.2 | 5,200 | 550 | 4,250 | 131 |
| 6 | 6:1 | 451,000 | 25 | 40,900 | 58 | 33,100 | 2.3 | 331,700 | 4.1 | 5,400 | 460 | 4,000 | 112 |
| 7 | 7:1 | 537,000 | 22 | 51,000 | 38 | 42,700 | 1.7 | 343,300 | 3.8 | 5,600 | 380 | 3,800 | 100 |
| 8 | 8:1 | 639,200 | 20 | 58,500 | 25 | 52,600 | 1.3 | 353,400 | 3.6 | 5,800 | 300 | 3,700 | 83 |
| 9 | 9:1 | 761,000 | 16 | 69,000 | 16 | 61,200 | 1 | 362,300 | 3.6 | 5,700 | 240 | 3,600 | 67 |
| 10 | 10:1 | 906,000 | 15 | 69,700 | 15 | 65,600 | 1 | 370,200 | 3.4 | 5,400 | 210 | 3,700 | 62 |
| 11 | 11:1 | 1,197,600 | 14 | 70,400 | 14 | 55,300 | 1 | 381,500 | 3.3 | 5,100 | 230 | 3,900 | 70 |

TABLE 2

Properties vs. Draw-down Ratio of High Density (0.959 g/cm$^3$), In-pocket Films

| | | Properties in Machine Direction (MD) | | | | | | Properties in Transverse Direction (TD) | | | | |
|---|---|---|---|---|---|---|---|---|---|---|---|---|
| Ex. No. | Draw-down ratio | Modulus psi | Elongation @ yield % | Tensile strength @ yield psi | Elongation @ break % | Tensile strength @ break psi | Elongation @ break/ elongation @ yield | Modulus psi | Elongation @ yield % | Tensile strength @ yield psi | Elongation @ break % | Tensile strength @ break, psi | Elongation @ break/ elongation @ yield |
| 12 | 1:1 | 189,000 | 7.0 | 4,700 | 640 | 6,200 | 91 | 222,800 | 6.0 | 5,300 | 750 | 5,300 | 125 |
| 13 | 2:1 | 225,100 | 13 | 6,700 | 290 | 11,100 | 22 | 262,600 | 3.9 | 4,500 | 600 | 5,100 | 154 |
| 14 | 3:1 | 268,200 | 30 | 15,900 | 120 | 16,100 | 4.0 | 285,900 | 3.7 | 4,600 | 630 | 4,900 | 170 |
| 15 | 4:1 | 319,500 | 41 | 24,500 | 53 | 21,100 | 1.3 | 302,600 | 3.6 | 4,700 | 660 | 4,600 | 183 |
| 16 | 5:1 | 380,700 | 36 | 29,900 | 39 | 26,100 | 1.1 | 315,500 | 3.8 | 4,800 | 610 | 4,400 | 161 |
| 17 | 6:1 | 453,600 | 31 | 36,800 | 40 | 31,100 | 1.3 | 325,700 | 4.2 | 4,900 | 530 | 4,200 | 126 |
| 18 | 7:1 | 540,300 | 27 | 43,200 | 38 | 36,100 | 1.4 | 334,600 | 4.5 | 5,000 | 470 | 3,900 | 104 |
| 19 | 8:1 | 643,700 | 18 | 50,200 | 29 | 41,000 | 1.6 | 342,300 | 4.6 | 5,400 | 570 | 3,700 | 124 |
| 20 | 9:1 | 767,000 | 15 | 54,000 | 28 | 46,000 | 1.9 | 349,000 | 4.3 | 5,200 | 610 | 3,500 | 142 |

TABLE 2-continued

Properties vs. Draw-down Ratio of High Density (0.959 g/cm³), In-pocket Films

| | | Properties in Machine Direction (MD) | | | | | | Properties in Transverse Direction (TD) | | | | |
|---|---|---|---|---|---|---|---|---|---|---|---|---|
| Ex. No. | Draw-down ratio | Modulus psi | Elongation @ yield % | Tensile strength @ yield psi | Elongation @ break % | Tensile strength @ break psi | Elongation @ break/ elongation @ yield | Modulus psi | Elongation @ yield % | Tensile strength @ yield psi | Elongation @ break % | Tensile strength @ break, psi | Elongation @ break/ elongation @ yield |
| 21 | 10:1 | 913,700 | 13 | 61,000 | 19 | 51,000 | 1.5 | 355,100 | 4.5 | 5,100 | 550 | 3,200 | 122 |
| 22 | 11.3:1 | 1,147,300 | 12 | 65,100 | 19 | 57,500 | 1.6 | 362,100 | 4.7 | 4,600 | 500 | 2,900 | 106 |

TABLE 3

Properties vs. Draw-down Ratio of High density Films of Various Densities and MI₂

| | Resin Properties | | | MDO Max. Draw-Down Ratio | Properties in Machine Direction (MD) | | | | |
|---|---|---|---|---|---|---|---|---|---|
| Ex. No. | Density g/cm³ | MI₂ dg/min | Film Process | | Elongation @ yield, % | Tensile strength @ yield, psi | Elongation @ break, % | Tensile strength @ break, psi | Elongation @ break/ Elongation @ yield |
| 11 | 0.959 | 0.057 | High Stalk | 11.6:1 | 14 | 70,400 | 14 | 55,200 | 1 |
| 22 | 0.959 | 0.057 | In-pocket | 11.3:1 | 12 | 65,100 | 19 | 57,500 | 1.6 |
| 23 | 0.940 | 0.057 | High Stalk | 8.3:1 | 3 | 8,400 | 30 | 52,200 | 10 |
| 24 | 0.940 | 0.057 | In-pocket | 7.6:1 | 2 | 7,600 | 28 | 53,600 | 14 |
| 25 | 0.940 | 0.12 | High Stalk | 6.5:1 | 3 | 7,200 | 41 | 32,900 | 14 |
| 26 | 0.940 | 0.12 | In-pocket | 2.2:1 | 16 | 4,800 | 320 | 11,400 | 20 |
| 27 | 0.949 | 0.075 | High Stalk | 11.9:1 | 12 | 56,600 | 12 | 55,500 | 1 |
| 28 | 0.949 | 0.075 | In-pocket | 7.7:1 | 2 | 9,200 | 25 | 52,700 | 13 |
| 29 | 0.949 | 0.057 | High Stalk | 10.6:1 | 3 | 13,600 | 19 | 53,200 | 6 |
| 30 | 0.949 | 0.057 | In-pocket | 10.0:1 | 10 | 51,200 | 29 | 63,500 | 3 |

| | Properties Transverse Direction (TD) | | | | |
|---|---|---|---|---|---|
| Ex. No. | Elongation @ yield, % | Tensile strength @ yield, psi | Elongation @ break, % | Tensile strength @ break, psi | Elongation @ break/ elongation @ yield |
| 11 | 3.3 | 5,100 | 230 | 3,900 | 70 |
| 22 | 4.7 | 4,600 | 500 | 2,900 | 106 |
| 23 | 4 | 4,700 | 710 | 4,900 | 178 |
| 24 | 4 | 4,500 | 740 | 4,400 | 185 |
| 25 | 4 | 4,500 | 730 | 4,300 | 183 |
| 26 | 6 | 3,700 | 770 | 4,800 | 128 |
| 27 | 2.9 | 4,000 | 470 | 3,500 | 162 |
| 28 | 4 | 4,900 | 710 | 4,000 | 178 |
| 29 | 4 | 4,800 | 690 | 3,500 | 173 |
| 30 | 4 | 5,300 | 700 | 4,100 | 175 |

I claim:

1. A method comprising the steps of:

receiving a high stalk, high density polyethylene (HDPE) film from a blown-film line orienting in the machine direction the high stalk, high density polyethylene (HDPE) film wherein the orienting step further comprises the steps of:

heating the high stalk, high density polyethylene film using a plurality of heating rollers to an orientation temperature to produce a heated film, wherein the orientation temperature is between (i) 60% of the difference between the glass transition temperature and the melting temperature; and, (ii) the melting temperature;

feeding the heated film into a plurality of rollers wherein the plurality of rollers stretches the film on a continuous basis to produce a stretched film;

annealing the stretched film to produce an annealed film; and, cooling the annealed film wherein the cooled film has a machine direction tensile strength at yield greater than 69,000 psi and a draw-down ratio greater than or equal to 11:1, wherein the HDPE has a density greater than 0.940 g/cm³, the HDPE has a weight average molecular weight (Mw) within the range of 150,000 to 500,000, the HDPE has a number average molecular weight (Mn) within the range of 11,000 to 20,000, and the HDPE has a molecular weight distribution (Mw/Mn) within the range of 9 to 20.

2. The method of claim 1 wherein the HDPE has a density greater than or equal to 0.949 g/cm$^3$.

3. The method of claim 1 wherein the HDPE has a density within the range of 0.949 g/cm$^3$ to 0.965 g/cm$^3$.

4. The method of claim 1 wherein the HDPE has a density within the range of 0.949 g/cm$^3$ to 0.959 g/cm$^3$.

5. The method of claim 1 wherein the Mw is within the range of 155,000 to 300,000.

6. The method of claim 1 wherein the Mw is within the range of 155,000 to 250,000.

7. The method of claim 1 wherein the oriented film has an elongation at break that is essentially the same as its elongation at yield.

8. The method of claim 1 wherein the molecular weight distribution is within the range of from 9 to 17.

9. The method of claim 1 wherein the HDPE has a melt index MI$_2$ of from about 0.02 to about 0.15 dg/min.

10. The method of claim 9 wherein the melt index MI$_2$ is from about 0.04 to about 0.15 dg/min.

11. The method of claim 9 wherein the melt index MI$_2$ is from about 0.05 to about 0.10 dg/min.

12. The method of claim 1 wherein the HDPE is a copolymer comprising from about 90 wt % to about 98 wt % recurring units of ethylene and from 2 wt % to about 10 wt % of recurring units of a $C_3$-$C_{10}$ α-olefin.

13. The method of claim 12 wherein the $C_3$-$C_{10}$ α-olefin is selected from the group of propylene, 1-butene, 1-pentene, 1-bexene, 4-methyl-1-pentene, 1-octene, and mixtures thereof.

* * * * *